United States Patent [19]

Shibayama

[11] Patent Number: 5,323,147
[45] Date of Patent: Jun. 21, 1994

[54] PAGING RECEIVER WITH DISPLAY FOR DISPLAYING RECEPTION STATE

[75] Inventor: Hiroaki Shibayama, Tokyo, Japan

[73] Assignee: NEC Corporation, Tokyo, Japan

[21] Appl. No.: 798,002

[22] Filed: Nov. 26, 1991

[30] Foreign Application Priority Data

Nov. 26, 1990 [JP] Japan .................. 2-318003

[51] Int. Cl.⁵ .................................. H04Q 7/00
[52] U.S. Cl. .................. 340/825.44; 340/311.1; 340/539; 455/51.1
[58] Field of Search .............. 375/106, 111, 117; 370/47, 91, 100.1; 455/51.1, 51.2; 340/825.44

[56] References Cited

U.S. PATENT DOCUMENTS

| | | | |
|---|---|---|---|
| 4,713,808 | 12/1987 | Gaskill | 370/94.100 |
| 4,949,085 | 8/1990 | Fisch et al. | 340/825.44 |
| 5,032,835 | 7/1991 | DeLuca | 340/825.44 |
| 5,049,874 | 9/1991 | Ishida et al. | 340/825.44 |
| 5,049,875 | 9/1991 | DeLuca et al. | 340/825.440 |
| 5,148,160 | 9/1992 | Kudoh | 340/825.440 |

Primary Examiner—Donald J. Yusko
Assistant Examiner—Edward Merz
Attorney, Agent, or Firm—Foley & Lardner

[57] ABSTRACT

Disclosed is a radio paging receiver wherein changes from the synchronous state to the asynchronous state and vice versa of a radio receiver are detected, the period of time that the receiver is in the asynchronous state is measured by a timing means and recorded, and the recorded period of time is displayed.

4 Claims, 3 Drawing Sheets

PAGING RECEIVER WITH DISPLAY FOR DISPLAYING RECEPTION STATE

BACKGROUND OF THE INVENTION

1. Field of the Invention

The present invention relates to a paging receiver with a display for displaying the state of reception, and, in particular, to a paging receiver for displaying an asynchronous or unlock state of the paging receiver when the receiver is outside a selective calling area.

2. Description of the Prior Art

When a synchronous state changes to an asynchronous state in a conventional paging receiver, a mark which indicates the asynchronous state is shown on a liquid crystal display (LCD), and an alarm tone is generated from a speaker during a specified time interval.

An example of such a conventional paging receiver is to be found in U.S. Pat. No. 4,928,086, entitled "Pager receiver having a common timer circuit for both sequential lock-out and out-of-range."

This type of conventional paging receiver indicates an asynchronous state but does not inform the user of an asynchronous period during which the receiver is outside the service area, so the problem remains that the asynchronous state cannot be accurately known later. In other words, the user cannot confirm later whether the data was transmitted or not or whether the receiver was outside the service area.

SUMMARY OF THE INVENTION

An object of the present invention is to provide, with due consideration to the drawbacks of such conventional devices, a paging receiver displaying the period of time during which the receiver is outside the service area.

This object is achieved in the present invention by the provision of a radio set comprising receiving means for receiving a radio frequency signal to produce a received signal, state change detection means responsive to said received signal for detecting a change from a synchronous state to an asynchronous state or vice versa of said radio set, timing means responsive to the output of said state change detection means for measuring the period of time during which said radio set is in the asynchronous state, recording means for recording said period of time measured by said timing means, and display means connected to said recording means for displaying said period stored in said recording means.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENT

Figure 1:
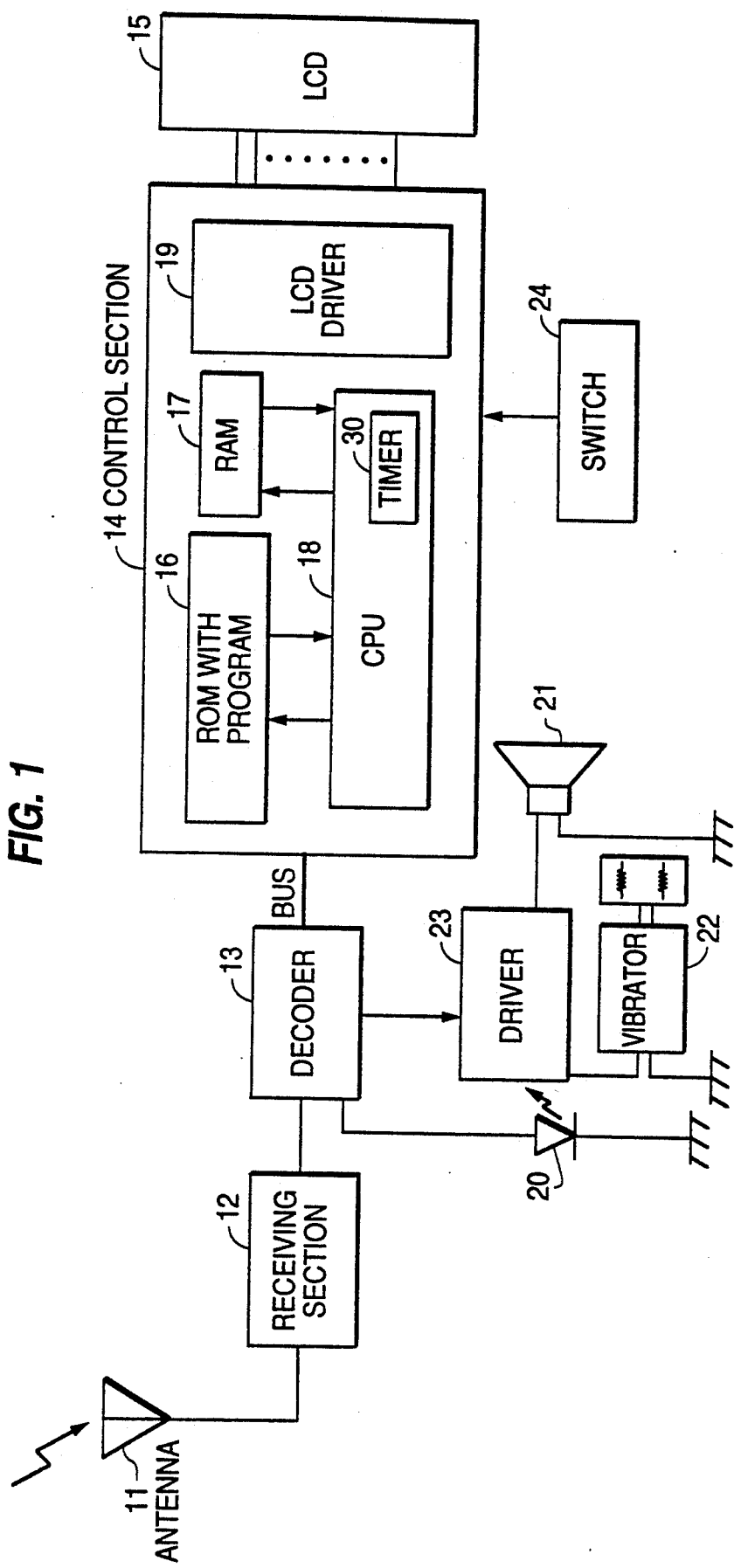
FIG. 1 is a block diagram showing the circuit configuration of a paging receiver embodying the present invention.

In FIG. 1 a paging receiver comprises an antenna 11 for receiving a radio frequency (RF) signal which is subjected to a frequency shift keyed (FSK) demodulated signal, for example. The receiver also comprises a receiving section 12 which demodulates the FSK modulated signal supplied from the antenna 11, a decoder 13 which decodes and detects the data from the signal demodulated by the receiving section 12, a control section 14 which is provided with an output signal from the decoder 13, and a liquid crystal display (LCD) 15 as a received data display means. The control section 14 in turn comprises a programmable read only memory (PROM) 16 for storing a program used in selecting an optional function of the paging receiver, a random access memory (RAM) 17 for recording received messages, a microcomputer 18 for control, and a driver 19 for driving the LCD 15. The receiver also comprises a light-emitting diode (LED) 20, a speaker 21 and a vibrator 22, and a driver 23 for driving the speaker 21 and the vibrator 22. A switch 24 is also provided to implement external interrupts in the microcomputer 18 of the control section 14.

Figure 2:
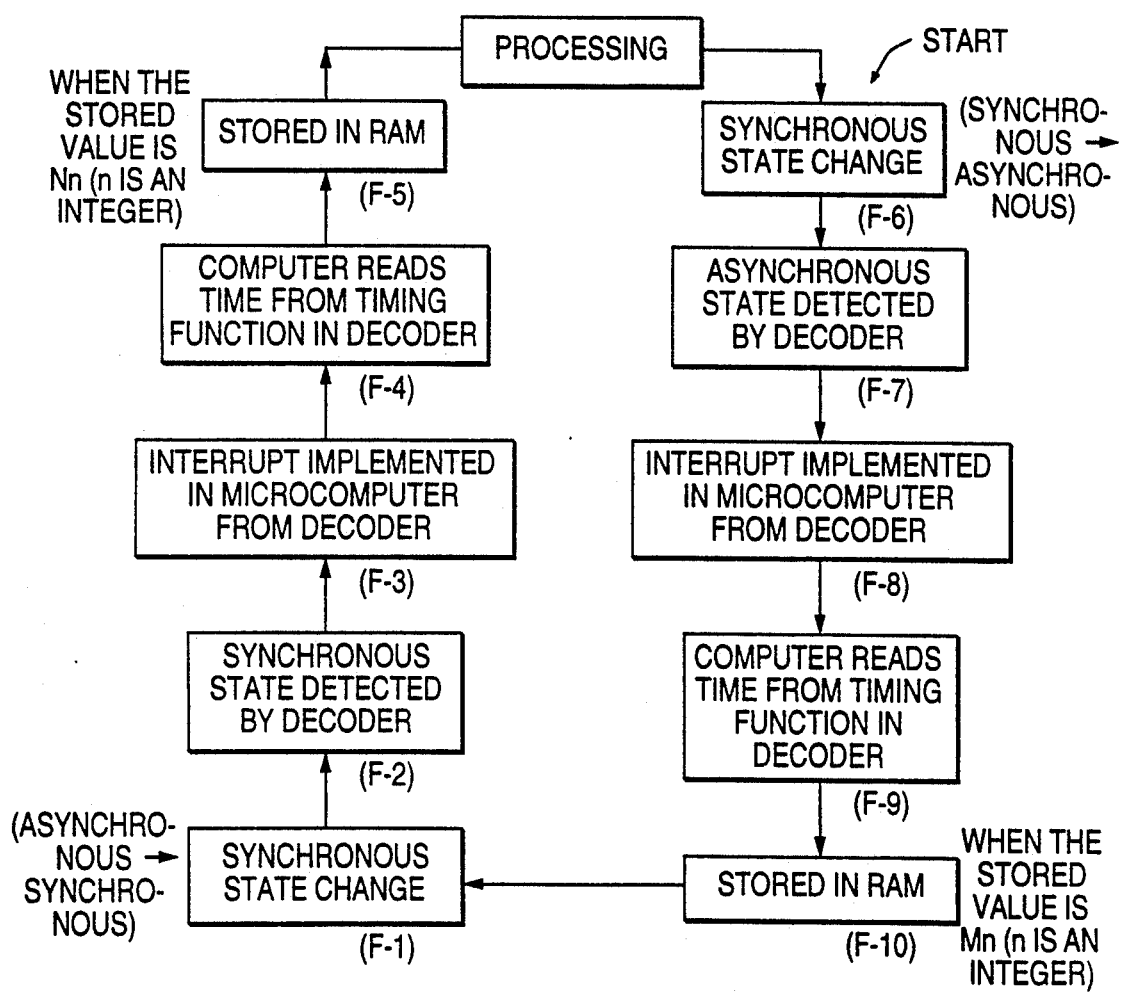
FIG. 2 is a flow chart for explaining the function of the receiver in FIG. 1 in displaying the period of time during which the receiver is outside the service area of the paging receiver.

FIG. 2 is a flow chart provided for explaining the function of displaying the time during which the receiver is outside the service area. The function of displaying the time during which the receiver is outside the service area of the paging receiver is mainly controlled by a program stored in the microcomputer 16, and a flag in the decoder 13.

Figure 3:
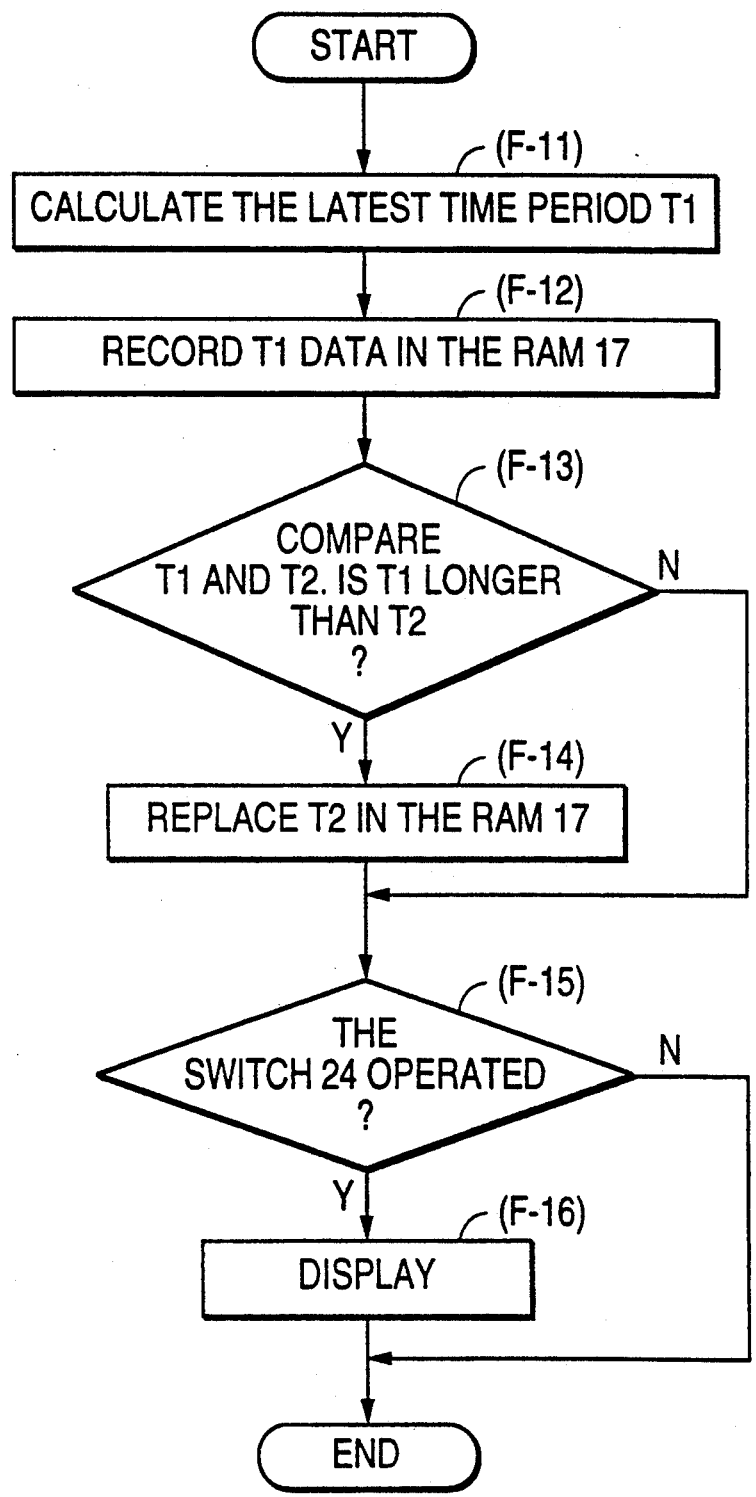
FIG. 3 is a flow chart for explaining the processing step shown in FIG. 2.

In FIG. 1, a signal received by the receiving section 12 through the antenna 11 is demodulated and supplied to the decoder 13. The control section 14 receives the demodulated data, detects a calling number from the demodulated data, and then compares the data for the detected calling number with a preassigned calling number in a conventional manner. If the two numbers are in agreement, the control section activates the LCD driver 19 to cause the LCD 15 to display a message which follows the calling number. The RF signal arrives at the antenna 11, and during the interval until the message is displayed on the LCD 15, a change from the asynchronous state to the synchronous state is produced (F-1), and this change to the synchronous state is detected by the decoder 13 (F-2). When the transmission of the RF signal is halted, or when the receiver is moved out of the service area, or the like, the receiver changes from the synchronous state to the asynchronous state (F-6). This change to the asynchronous state is detected by the decoder 13 (F-7), and an interrupt is implemented in the microcomputer 18 of the control section 14 (F-3, F-8). In response to the interrupt, the microcomputer 18 reads the time at which the interrupt was produced by means of a timer section 30 built into either the decoder 13 or the microcomputer 18 (F-4, F-9), and records this time in the RAM 17 in the control section 14 (F-5, F-10). When the transmission of the signal commences once more, or when the receiver is moved back into the service area, the receiver reverts to the synchronous state from the asynchronous state (F-1), and this time is also recorded in the RAM 17 (F-5). The control section 14 judges whether the receiver is in the synchronous state or in the asynchronous state by detecting sync words (including the transmitted signal, as described in U.S. Pat. No. 4,928,086 mentioned earlier. Detail of the processing step shown in FIG. 2 are shown in FIG. 3. The control section 14 calculates the length of time T1 that the receiver is in the asynchronous state from the time of the synchronous state change and records the results in the RAM 17 (F-11 and F-12). The latest recorded time-period data is then compared with the time period data T2 which had previously been calculated and recorded in the RAM 17, and the contents of the RAM 17 are replaced so that only the longer time period is stored in the RAM 17 (F-13 and F-14). In this manner, the data for the newest asynchronous time period T1 and the data for the longest previous asynchronous time period T2 is recorded in the RAM 17. An interrupt is implemented in the microcomputer 18 by the switch 24 and these contents are displayed on the LCD 15 through the LCD driver 19 (F-15 and F-16).

As can be readily understood from the foregoing explanation, in the present invention, by recording the time outside the service area and the time when the synchronous period is re-entered, the period when the receiver was out of communication can be later confirmed from the state the receiver was in. Also, by means of the present invention, the condition of the received electric field can be determined by determining the asynchronous state of the receiver.

The above embodiment of the present invention is given for illustration of the invention and is not intended to be limiting thereof.

What is claimed is:

1. A paging receiver comprising:
   receiving means for receiving a radio frequency signal to produce a received signal;
   state change detection means responsive to said received signal for detecting a change from a synchronous state to an asynchronous state, or vice versa, of said paging receiver;
   timer means responsive to the output of said state change detection means for generating time data which denotes the time of said change;
   calculating means for calculating a period of time during which said paging receiving is in the asynchronous state according to said time data;
   first recording means for recording said period of time calculated by said calculating means; and
   display means connected to said recording means for displaying said period of time stored in said first recording means.

2. A paging receiver as claimed in claim 1 wherein said period of time recorded in said first recording means is a latest period of time during which said paging receiver was in the asynchronous state.

3. A paging receiver as claimed in claim 2 further comprising second recording means for recording data relating to a longest previous period of time during which said paging receiver was in the asynchronous state.

4. A paging receiver as claimed in claim 3 further comprising a comparing means for comparing said latest period of time with said longest previous period of time and wherein said second recording means records the latest period of time as a new longest previous asynchronous period of time if said latest period of time is longer than an old longest previous period of time.

* * * * *